US007916437B2

(12) United States Patent
Hardesty et al.

(10) Patent No.: US 7,916,437 B2
(45) Date of Patent: Mar. 29, 2011

(54) FAULT INTERRUPTER AND OPERATING METHOD

(75) Inventors: Gary W. Hardesty, Northfield, IL (US); Michael G. Ennis, Evanston, IL (US); Richard G. Smith, North Aurora, IL (US)

(73) Assignee: S&C Electric Company, Chicago, IL (US)

( * ) Notice: Subject to any disclaimer, the term of this patent is extended or adjusted under 35 U.S.C. 154(b) by 112 days.

(21) Appl. No.: 12/132,578

(22) Filed: Jun. 3, 2008

(65) Prior Publication Data

US 2008/0303615 A1 Dec. 11, 2008

Related U.S. Application Data

(60) Provisional application No. 60/942,023, filed on Jun. 5, 2007.

(51) Int. Cl.
*H02H 3/00* (2006.01)

(52) U.S. Cl. ........................................ 361/42; 361/75

(58) Field of Classification Search .................... 361/42, 361/71–73, 75
See application file for complete search history.

(56) References Cited

U.S. PATENT DOCUMENTS 4,107,778 A * 8/1978 Nii et al. ........................ 702/59
4,571,658 A 2/1986 Ruta
4,916,573 A 4/1990 Ruta
5,768,079 A * 6/1998 Buell ............................ 361/78

OTHER PUBLICATIONS

S&C Fault Filter® Electronic Power Fuses, *Indoor Distribution 4.16 kV through 25 kV*, Descriptive Bulletin 441-30, Mar. 31, 2003, pp. 1-11.

* cited by examiner

*Primary Examiner* — Danny Nguyen

(57) ABSTRACT

A fault interrupter and a method of operating a fault interrupter to reduce arcing time during fault interruption. Fault interrupter operation is delayed following detecting a peak current such that its operation occurs at a point of the current wave resulting in reduced arcing during fault isolation.

14 Claims, 6 Drawing Sheets

FAULT INTERRUPTER AND OPERATING METHOD

CROSS-REFERENCE TO RELATED APPLICATIONS

This application claims priority to and benefit from U.S. Provisional Patent Application Ser. No. 60/942,023, filed Jun. 5, 2007, the disclosure of which is hereby incorporated herein by reference for all purposes.

TECHNICAL FIELD

This patent relates to a fault interrupting and reclosing device, and more particularly, to a fault interrupting device and associated operating method.

BACKGROUND

Fault interrupting devices function to isolate a fault condition in a power distribution system. Upon clearing of the fault condition some fault interrupting devices are also operable to reclose the circuit. Faults in a power distribution system can occur for any number of reasons and are often transient. Detection and isolation of the fault mitigates damage to the system as a result of the fault. An ability to reclose the circuit following a fault without replacement of hardware components allows the power distribution system to be returned to normal operation quickly, and in some instances, without operator intervention.

Combined fault interrupting and recloser devices may be designed to operate or be operated after a fault interruption to reclose the faulted line or lines. Following reclosing, if the fault is not cleared the device will detect the fault and again operate to open the circuit to isolate the fault. When a fault is determined to be permanent, the fault interrupting device should act to isolate the circuit and prevent further reclosing attempts.

Several types of fault interrupting and reclosing devices incorporate vacuum interrupters to perform the circuit interrupting and subsequent reclosing functions. During current interrupting operation, as the vacuum interrupter contacts open, there is redistribution of material from the contacts to the other surfaces within the interrupter. Contact material redistribution occurs with each operation, and therefore, the vacuum interrupter is capable only of a finite number of fault current interrupting operations. The number of fault interrupting operations may be specified for a particular fault protection device based upon design information and intended application. The fault interrupting and reclosing device may include a counter to track the number of operations.

The vacuum interrupters in fault interrupting and reclosing devices are capable of operating very quickly under the action of a drive mechanism, such as a drive solenoid. Operation in the presence of an asymmetric current can expose the contacts to large arcing time, for example, arcing times in excess of 10 ms. Such long arcing times have the potential to seriously degrade the life of the fault interrupter and reclosing device.

In practice, therefore, the actual number of interrupting cycles a vacuum interrupter is capable of, and hence the fault interrupting and reclosing device incorporating the interrupter, depends on a number of operating characteristics including characteristics of the interrupted fault current and the operating characteristics of the vacuum interrupter. For example, material erosion and corresponding contact degradation become significantly more pronounced with the magnitude and asymmetry of the interrupted current. The number of cycles defining the life of the fault interrupting device is conservatively set to ensure the proper operation of the device throughout its specified life and over its rated current interrupting capacity.

DETAILED DESCRIPTION

A fault interrupting and reclosing device includes a circuit interrupting device such as a vacuum fault interrupter, an arc spinner interrupter or the like, coupled to an actuator. The actuator includes at least one force generating element for generating an operating force for operating the circuit interrupter to open the circuit, for example, to generate a linear force to open the contacts of the circuit interrupter, and for generating a restoring force to close circuit interrupter to close the circuit. The actuator may include an electro-magnetic actuator such as a solenoid to drive the contacts open and a spring to close the contacts. The device may further include a latch, such as an electro-mechanical latch, to engage the actuator to retain the state of the circuit interrupter. For example, to hold the vacuum interrupter contacts closed when the circuit is closed and to hold the contacts open when the circuit is opened. Control electronics, which may include one or more of a dedicated processor, a general purpose processor, an application specific integrated circuit, or the like, may be employed to monitor current characteristics, to monitor the position of the vacuum fault interrupter mechanism, and to affect operation of the circuit interrupter responsive thereto.

Figure 1:
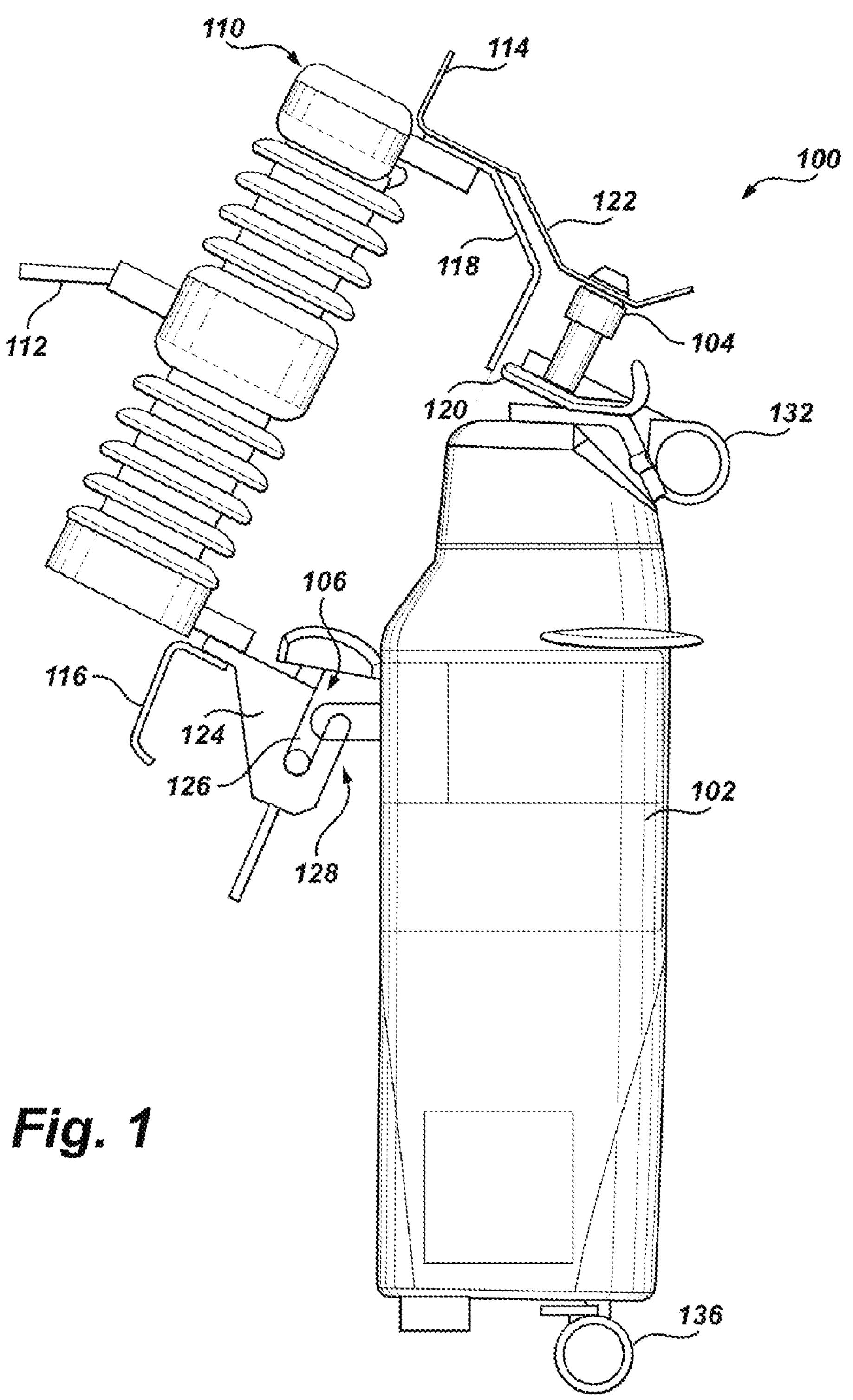
FIG. 1 is a graphic illustration of a fault interrupting reclosing device in a set or connected position wherein it is operable for connecting a source and load of a power distribution system.

While the present invention has application to virtually any fault interrupting device, the following discussion of a particular type of fault interrupting device provides an environment for describing and understanding the various embodiments and aspects of the invention. Referring to FIG. 1, a fault interrupting and reclosing device 100 includes a housing 102 including a first tap 104 and a second tap 106. The housing 102, first tap 104 and second tap 106 are configured to allow the device 100 to couple to mounting 110, such as a mounting commonly referred to as a cut out mounting or other suitable mounting. The mounting 110 may include a support 112 permitting the mounting 110 to be secured to a pole or other structure (not depicted) for supporting the mounting 110 relative to the lines of the power distribution system. The first tap 104 may be secured to a supply coupling 114 of the mounting 110 and the second tap may secure to a load coupling 116 of the mounting 110. The supply coupling 114 may include an alignment member 118 that engages an alignment member 120 of the device 100 for aligning the tap 104 relative to a contact 122 that electrically couples the tap 104 to the supply of the power distribution system.

The load mounting 116 may include a trunnion 124 secured to the mounting 110. The trunnion 124 is formed to include a channel 125 within which a sliding contact/pivot member 126 is disposed. The member 126 is coupled as part of a release mechanism 128 that provides for releasing the device 100 from the mounting 110, for example, after a predetermined number of failed reclose attempts.

FIG. 1 depicts the device in a connected position wherein the device is electrically coupled to both the supply side 114 and the load side 116 of the power distribution system via the cut out mounting 110. The device may also be disposed in a disconnected position. The device 100 includes a hook ring 132. Using a "hot stick" or other suitable insulated tool, a technician can grasp the hook ring, and pulling away from the cut out mounting 110, cause the tap 104 to separate from the strap 122. The strap 122 normally bears against the tap 104, the force of which is sufficient in normal operation to retain the device 100 in the connected state and ensure electrical conductivity. However, by applying a force to the hook ring 132, the tap 104 may be separated from the strap 122. Once separated, the device 100 is free to rotate about the pivot 130 away from the cut out mounting 110. If mounted vertically, as depicted in FIG. 1, gravity will act to cause the device 100 to rotate about the pivot 130 to a disconnect position. The hook ring 132 also allows the device 100 to be moved to the connected position depicted in FIG. 1.

The device 100 may be operated, as will be explained, in an automatic mode. In the automatic mode, upon fault detection, the device 100 operates to open, without disconnecting from the power distribution system, to isolate the fault. The device 100 may then attempt to reclose one or more times. If after reclosure the fault is no longer detected, the device 100 remains closed. If, however, the fault is persistent, the device 100 will again open. After a predetermined number of reclose attempts, the release mechanism acts to release the device 100 from the mounting 110 allowing the device to drop out of the connected state shown in FIG. 1 and into the disconnected state.

Figure 2:
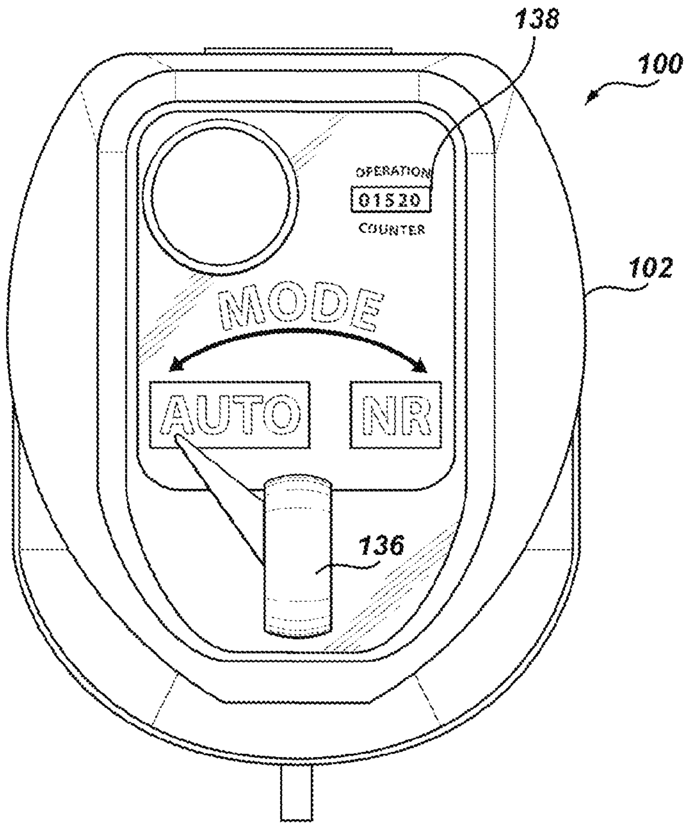
FIG. 2 is a bottom view of the fault interrupting device illustrated in FIG. 1.

In certain applications it may be desirable to disable the reclose function. In that case, upon a first fault detection the device will release or "drop out" of the mounting to the disconnected position. A selector 136 (FIG. 2) is provided to allow a technician to set the operating mode, automatic (AUTO) or non-reclosing (NR). For example, the selector 136 may include a ring 136 so that the selector 136 may be actuated using a hot stick or other suitable tool from the ground or a bucket truck. A cycle counter 138 may also be provided. The cycle counter 138 provides an indication of the total interrupt cycles, and hence provides an indication of when the device may require service or replacement, a record of fault activity and data for statistical analysis of device and/or system performance.

Figure 3:
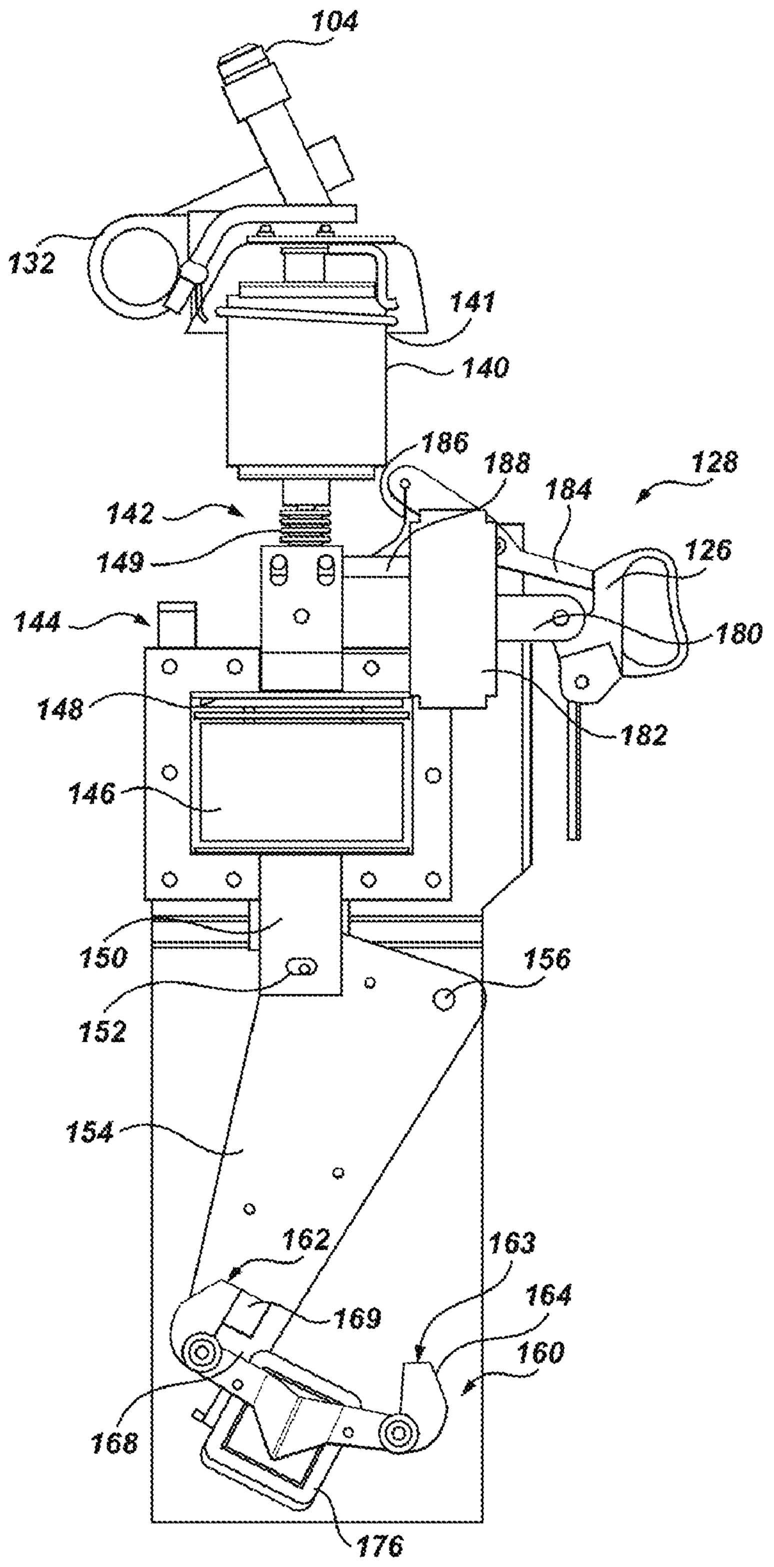
FIG. 3 is a graphic illustration of the operative elements disposed within the housing of the fault interrupting reclosing device of FIG. 1.

FIG. 3 depicts a circuit interrupting device 140 of the device 100. The circuit interrupting device 140 may be any suitable device examples of which include vacuum interrupters and arc spinner interrupters. The circuit interrupter 140 may be coupled by an insulating coupling 142 to a solenoid 144. The solenoid 144 may be configured with a first, primary coil 146 conducting the line-to-load current that is used to generate, as a result of a fault current, an opening force on the coupling 142 for actuating the circuit interrupting device 140, for example, exerting an opening force on the contacts of the vacuum interrupter. If the circuit interrupting device is a vacuum interrupter, as depicted in the exemplary embodiment illustrated in FIG. 3, it may include an axial magnetic field coil 141 allowing the vacuum interrupter 140 to interrupt a fault current in excess of that for which it is rated.

Figure 4:
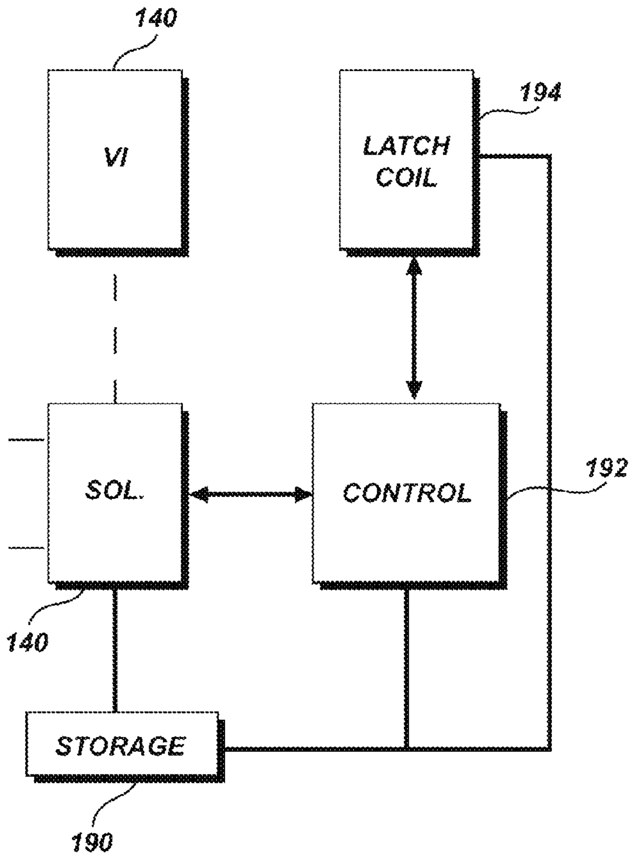
FIG. 4 is a block diagram illustrating the operational and control elements for a fault interrupting reclosing device such as the device of FIG. 1.

The solenoid 144 may further include a secondary coil winding 148 that may be used as a transformer source for providing electrical energy to storage devices 190 such as capacitors for operating the solenoid 144 a release latch assembly 160 and a controller and/or control electronics 192 (FIG. 4). The solenoid 144 may also include a spring 149. The spring 149 provides a closing force on the coupling 142 for returning the circuit interrupter to the closed or connected state, for example, by urging the contacts closed. More than one spring may be provided. For example, a first spring may be used to provide a closing force while a second spring is used to provide a biasing force to maintain the contacts in contact. Therefore, the device 100 includes a solenoid 144 operable to provide an opening force (energized coil) and a closing force (spring).

A pin or other suitable coupling 152 couples the solenoid plunger 150 to a lever 154. The lever 154 is mounted within the bracket (not depicted) to pivot about a pivot point 156. The coupling of solenoid plunger 150 to the lever 154 causes pivoting motion of the lever 154 upon extension and retraction of the solenoid plunger 150 relative to the solenoid 144.

Still referring to FIG. 3, the device 100 may further include a latch assembly 160. The latch assembly 160 is secured within the housing 102 and has a generally "C" or claw shape structure including a first latching portion 162 and a second latching portion 163. The latch assembly 160 essentially consists of a pair of electrically controllable "horseshoe" magnets 164 and 165 (magnetic stator pieces); the respective end positions of which define the first latching portion 162 and the second latching portion 163. The magnets 164 and 165 are spaced apart so as to define a slot 167 within which an armature 168 of the lever 154 is disposed. The armature 168 itself may be magnetic or made of magnetic material, or, as depicted, the end may include a magnet insert 169.

The magnet stator 164 and 165 is formed by combining "C" or "horseshoe" shaped permeable members 170 and 172 having magnetic material 174 disposed between them at a specific location. Combined with the magnetic material 174 is a coil 176. The coil 176 is coupled to the control electronics to receive an electric current the affect of which is to neutralize the magnetic field of the magnetic material 174. Absent current in the coil, the magnetic material 174 acts to create a magnetic field shared by the members 170 and 172 within the first and second latching portions 162 and 164 to retain the lever 154 at either of the first or second latching portions 162 and 164, depending on the state of the actuator and the circuit interrupter. The magnetic material may be disposed closer to one end of the "C" shape than the other, such that by its relative position, the magnetic force applied to the magnet insert (armature) 169 may be greater at one latching portion, for example 162, than the other, for example 164. Application of current within the coil acts to neutralize the magnetic field in the first and second latching portions 162 and 164 such that under action of the solenoid 144 the circuit interrupting device may be driven from the closed or connected state to the open or disconnected state, or, under action of the return spring 149, the circuit interrupting device may be driven from the open or disconnected state to the closed or connected state. This is explained in more detail below.

With the solenoid 144 in the circuit closed position or connected state, the end 168 is disposed adjacent the first latching portion 162. Absent current in the coil 176, a magnetic field is present in the first latching portion 162 that exerts a retaining force on the end 168 and/or the magnetic insert 169, as the case may be. The retaining force resists movement of the end 168, and hence the lever 154, latching it and the solenoid 144, in the circuit closed position. Upon detection of a fault current, the solenoid 144 generates a force on the solenoid plunger 150 to open the circuit interrupting device 140. Concomitantly, the control electronics 192 applies a current to the coil 176 neutralizing the magnetic field releasing the lever 154. Axial movement of the solenoid plunger 150 in conjunction with the opening of the circuit interrupter 140 causes the lever 154 to rotate such that the end 168 is disposed adjacent the second latching portion 164. The current is removed from the coil 176 restoring the magnetic field such that the second latching portion 164 exerts a force on the end 168, which resists movement of the end 168 and latches the lever 154, and hence the solenoid 144, in the circuit open position or disconnected state. Current may be removed from the coil 176 at any point in the travel of the lever 154, to minimize the energy drawn from the energy storage means. The force of the magnet, in combination with the mechanical advantage provided by having the magnet act on the end 168 relative to the pivot 156, provides sufficient force to resist the closing force exerted by the spring 149. Of course, it should be understood that in other embodiments, various combinations of linkages, gears or other force-multiplying arrangements may be employed.

To close the circuit interrupting device, current is again applied to the coil 176 to neutralize the magnetic field. With the magnetic field neutralized, the lever 154 is free to move and the spring 146 has sufficient strength to force circuit interrupting device 140 to the closed position or connected state. Once the end 168 is substantially disengaged from the second latching portion 164, the current within the coil 176 is terminated restoring the magnetic field and the retaining magnetic force. The lever 154 is again latched on contacting the first latching portion 162. Thus, the latch assembly 160 provides for latching the solenoid 144 in both the circuit open position/disconnected state and the circuit closed position/connected state. The required mechanical advantage and magnet strength is determined for the particular application. For example, the latch assembly 160 in combination with the mechanical advantage may provide a hold force that is greater than the solenoid acting force, e.g. two or more times the solenoid acting force.

A flexible conductive strap (not depicted) may couple from a moving contact 172 of the circuit interrupter 140 to the solenoid 144 for providing electrical power to the first coil 146 and the second coil 148. The flexible strap may also couple fault current to the solenoid 144. When a fault current exists, the fault current passing through the solenoid coil 146 develops an axial force sufficient to drive the circuit interrupter 140 to an open/disconnected state. Once opened, the circuit interrupter 140 is held open by the latching capability of the latch 160 acting on the lever 154.

The controller 192 is operable upon fault detection to energize the coil 176 to negate the magnetic field of the magnetic material 174 to allow the solenoid 144 to drive the circuit interrupter 140 to the open state. The controller 192 is also operable to energize the coil 176 to negate the magnetic field of the magnetic material 174 to allow the circuit interrupter 140 to close under action of the spring 149. Once the contacts are closed, the circuit interrupter 140 again conducts, and current is coupled by the strap to the solenoid coil 148. If the fault current persists, the device 100 again acts to open the circuit.

The controller 192 is operable to provide for and manage reclose attempts, and for example, to provide a delay between reclose attempts and to count the number of reclose attempts. Should the number of reclose attempts exceed a threshold value, then the device 100 may be caused to drop out. The controller further may delay energizing the coil 176 thereby restraining the solenoid until its release will result in the minimum arcing time at the contacts of the interrupter while still assuring successful latching in the circuit open position. For example, the block diagram of FIG. 4 illustrates the solenoid 144 mechanically coupled to the circuit interrupter 140. The solenoid 144 also couples to an energy storage device 190, such as a capacitor or series of capacitors. A controller 192 couples to the solenoid 144 to monitor fault current and the number of interrupt operations and to energize the coil 176 to release the latch 160. The controller 192 also couples to the actuator 182 in order to affect drop out, if necessary.

For fault currents above a threshold, which can be user defined and/or dynamically/automatically determined, and in one example 2 kiloAmps (kA), the controller only causes activation of the fault interrupter 140 within a prescribed window of a cycle of the periodic waveform subsequent to the decision having been made to open the fault interrupter. This window of time may be a set period of time following the time of occurrence of the first peak of the preceding cycle of current. Alternatively, the window of time may be dynamically determined. The window may preferably be determined so as to minimize arcing time during opening of the contacts by causing the opening to occur at a favourable point on the current wave for reducing arcing time.

Figure 5:
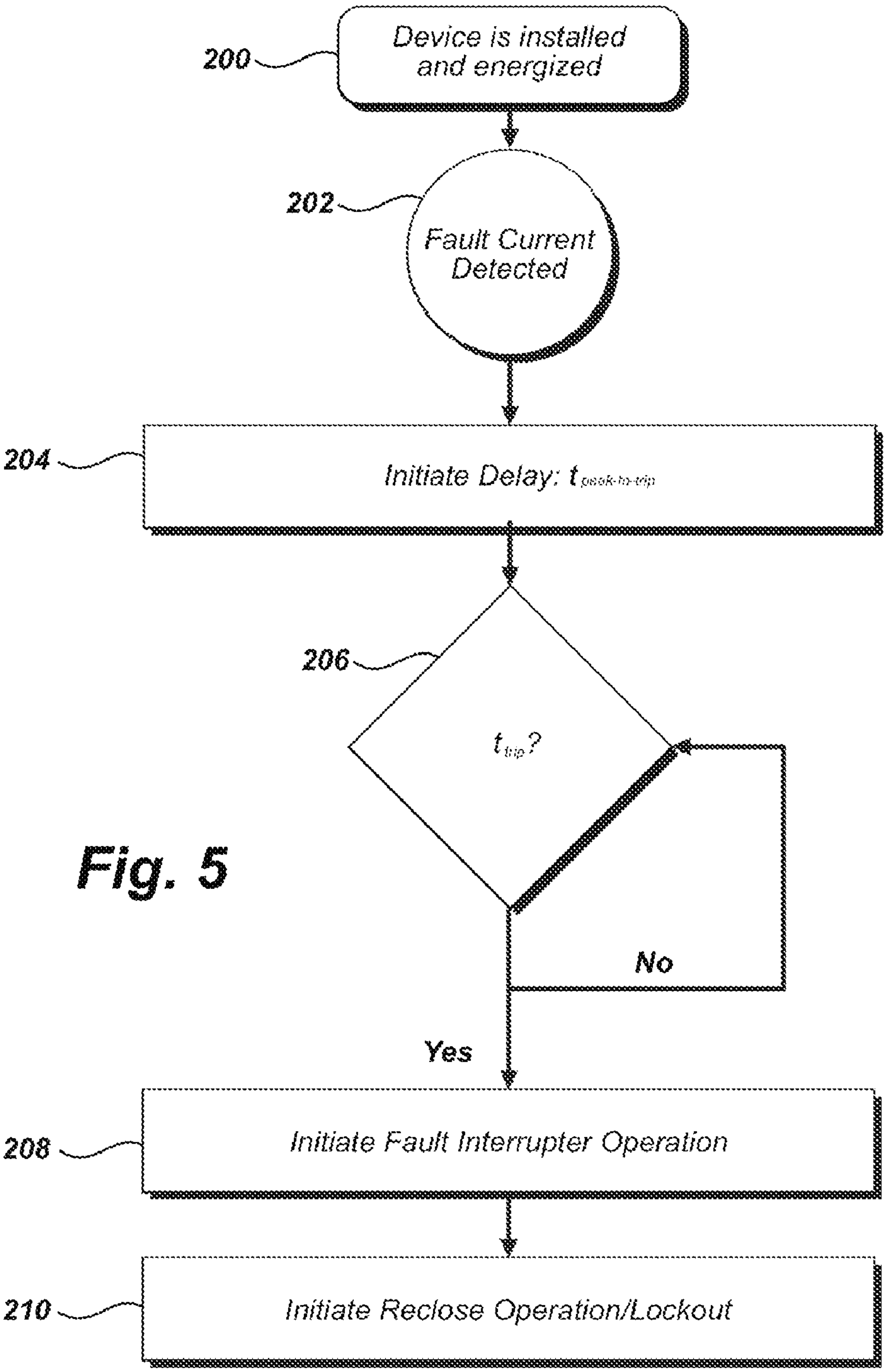
FIG. 5 is a flowchart illustrating a method of operating a vacuum fault interrupter.

With reference to FIG. 5, coupled to monitor the current in the conductor of the power distribution system (200), the controller 192 is able to monitor current magnitude in the time domain and to determine whether the current is above or below a given threshold (202). This monitoring is in addition to the normal relay-like measurement of the rms current, compensating for any asymmetric components. Once the controller 192 determines that the measured symmetric current is both above a trip threshold and above an algorithm threshold (204) it initiates a delay algorithm (206). This algorithm (206) may call for energizing the solenoid 144 (210) following a predetermined delay following the first maximum absolute magnitude current measurement. For example, the controller 192 may delay a release signal to the solenoid 144 for a time period (208), which may be fixed or dynamic and may be related to the operating characteristics of the fault interrupter 140. In a device that employs sixteen current measurements per cycle the time interval may be set to expire fourteen sample periods after the first maximum absolute magnitude current measurement. The time when the first peak is measured relative to when the first current measurement sample that is taken following processor activation will be different for currents having different degrees of asymmetry. However, the time delay from the time of occurrence of the first peak to the initiation of the opening of the interrupter will be the same for both symmetric and asymmetric currents. Following operation of the fault interrupter to isolate the fault, the controller 192 then initiates a reclose or lockout operation based upon the fault persistence, end-of-life of the fault interrupter, non-reclose setting of the fault interrupter or the like (212).

The frequency of current sampling by the controller 192 needs to be at least eight times that of the system frequency in order to identify, with useful resolution, the occurrence in time of the peak magnitudes of the periodic current. The window of time for activating the opening of the fault interrupter 140 needs to be determined based upon the timing variability of the fault interrupter operating mechanism and also upon the time resolution of the acquisition of the current samples.

For example, the device 100 may include a fault interrupter 140 with contacts that are capable of going from being fully closed to being locked open state in no less than 3 ms and no more than 5 ms. The controller 192 for the device 100 may take current samples 16 times per 60 Hz cycle. Upon detecting current above the instantaneous current magnitude threshold, e.g., RMS current exceeds a threshold, the controller 192 records the time, $t_{peak}$, at which this first current peak is detected. It also initiates a delay counter. The delay may be set to cause activation of the fault interrupter 140 opening mechanism at a time $t_{peak\text{-}to\text{-}trip}$, which may be 6.46 milliseconds (ms) past detecting the peak magnitude current. Activation is initiated at a time $t_{trip}$. In this current example, time $t_{peak\text{-}to\text{-}trip}$ is 14.79 ms ($t_{peak\text{-}to\text{-}trip}+t_{single\ cycle}$; 6.46 ms+8.333 ms for a 60 Hz system) past the time $t_{peak}$ of occurrence of the first peak current of the preceding cycle where the first peak current exceeds a threshold. In the example, time $t_{peak\text{-}to\text{-}trip}$ of 6.46 ms is the 4.167 ms time from the time $t_{peak}$ of occurrence of the most recent peak magnitude to the next zero-current crossing (¼ of a cycle of the 60 Hz current) plus the 3.333 ms from that zero-current crossing to the point in time that is 5 ms prior to next zero-current crossing minus 1.041 ms, the time period between samples of current taken by the control. Equation 1 illustrates this relationship generally.

$$t_{peak-to-trip} = \frac{3}{4f} - t_{trip-mech-max} - \frac{1}{f_{sample}} \qquad \text{Equation 1}$$

$t_{peak\text{-}to\text{-}trip}$=time from occurrence of most recent peak magnitude of most recent current cycle to time of activation of fault interrupter trip mechanism; $t_{trip\text{-}mech\text{-}max}$=maximum time required by the mechanism for the fault interrupter contacts to go from closed to locked in the open state; (e.g., 5 ms typical for a vacuum fault interrupter but dependent upon the type of fault interrupting device); f=electrical distribution system frequency, typically 50 Hz or 60 Hz. (60 Hz in the example); $f_{sample}$=frequency of the acquisition of current samples by the control. (e.g., minimum 8 times $f_{sample}$; and demonstrated 16 times $f_{sample}$, or 960 Hz in the example).

Figure 6:
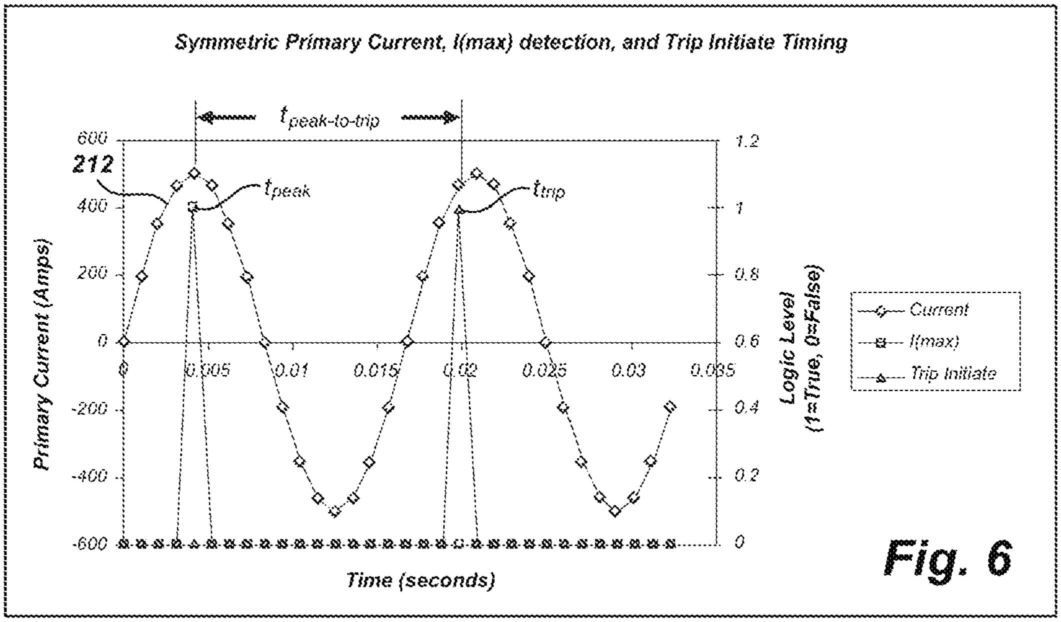
FIGS. 6 and 7 are charts illustrating operation of a vacuum fault interrupter relative to current characteristics.
Figure 7:
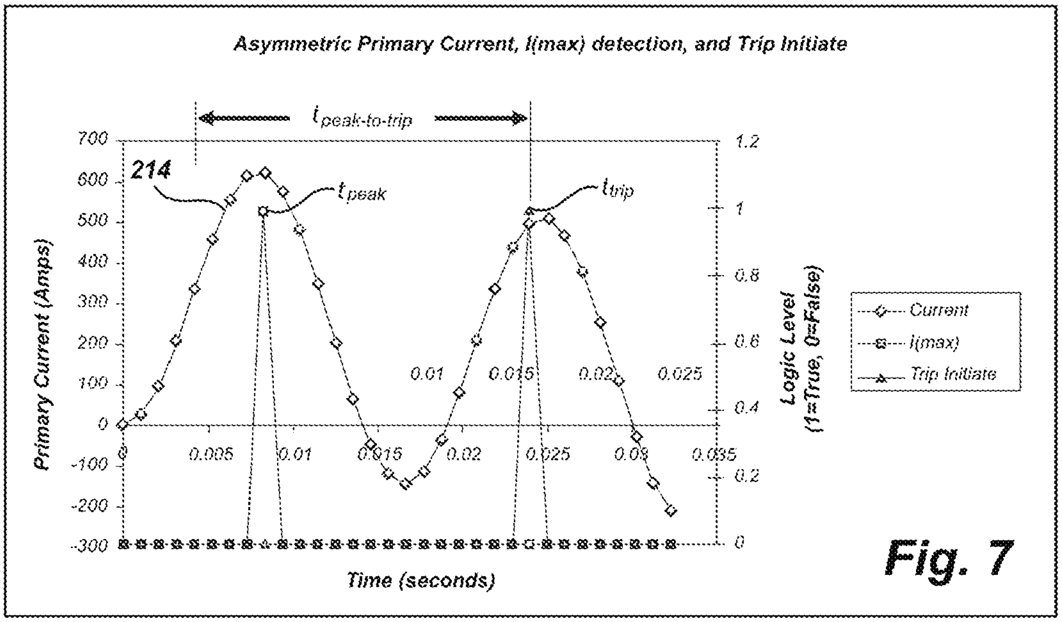

FIG. 6 and FIG. 7 additionally provide graphical illustrations of the timing of the primary current, the detection of the first (positive in this case, but may be negative) current peak, and the initiation of the fault interrupter 140. A symmetric current is depicted in FIG. 5 by the trace 200. FIG. 6 is similar to FIG. 5 but illustrates an asymmetric current depicted by the trace 202. The controller 192 detects the first current peak exceeding the threshold occurs at time $t_{peak}$. The controller 192 then initiates a delay, time $t_{peak\text{-}to\text{-}trip}$. Fault interrupter 140 operation is initiated at the time $t_{trip}$. The operation of the fault interrupter 140 is delayed to a point on the current wave 200 that reduces arcing time, and hence, enhances fault interrupter useful life. Advantageously, because the device designer has accounted for and has reduced the possibility of fault interruption at a point on the current wave that would result in long arcing times and significant contact degradation, the designed delay may increase the number of fault interrupting cycles before establishing the end-of-life of the device.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. §112, sixth paragraph.

We claim:

1. A fault protection device comprising:

a fault interrupter having a conducting state and a non-conducting state;

a detector having a detector output indicative of a fault current state of a coupled electrical conductor;

a controller having a controller output coupled to the fault interrupter, the controller output based upon the detector output and the fault interrupter operable responsive to the controller output to change from the conducting state to the non-conducting state; wherein the controller delays the controller output a peak-to-trip time period to reduce arcing time during fault interrupter operation.

2. The fault protection device of claim 1, the fault current state comprising a peak current above a threshold.

3. The fault protection device of claim 1, wherein the peak-to-trip time period is based upon a zero-current crossing time.

4. The fault protection device of claim 1, wherein the peak-to-trip time period is based upon a current frequency.

5. The fault protection device of claim 1, wherein the peak-to-trip time period is based upon operating time of the fault interrupter.

6. The fault protection device of claim 1, wherein the peak-to-trip time period is based upon the equation:

$$t_{peak-to-trip} = \frac{3}{4f} - t_{trip-mech-max} - \frac{1}{f_{sample}}$$

$t_{peak\text{-}to\text{-}trip}$=time from occurrence of most recent peak magnitude of most recent current cycle to time of activation of fault interrupter trip mechanism; $t_{trip\text{-}mech\text{-}max}$=maximum time required by the mechanism for the fault interrupter contacts to go from conducting state to non-conducting state; f=electrical distribution system frequency and $f_{sample}$=frequency of the acquisition of current samples by the control.

7. A fault protection device comprising:

a fault interrupter having a conducting state and a non-conducting state, the fault interrupter operable responsive to a fault current in a coupled conductor to change state from the conducting state to the non-conducting state; and a delay device coupled to the fault interrupter to cause the fault interrupter to delay its change from the conducting state to the non-conducting state a peak-to-trip delay time.

8. The fault protection device of claim 7, wherein the peak-to-trip delay time is based upon at least one of a fault interrupter operating time; a zero-current crossing time or a current frequency.

9. A method of operating a fault interrupting device to isolate a fault in a conductor coupled to the fault interrupting device, the method comprising:

determining a peak time, the peak time being associated with the occurrence of a peak current indicative of a fault in the conductor;

utilizing a peak-to-trip delay time to establish a trip time for the fault interrupter to operate; and operating the fault interrupter at the trip time to isolate the fault in the conductor.

10. The method of claim 9, wherein determining the peak time comprises determining a time at which a fault current state exists in the conductor, the fault current exceeding a threshold.

11. The method of claim 9, wherein the peak-to-trip time period is based upon a zero-current crossing time.

12. The method of claim 9, wherein the peak-to-trip time period is based upon a current frequency.

13. The method of claim 9, wherein the peak-to-trip time period is based upon operating time of the fault interrupter.

14. The method of claim 9, wherein the peak-to-trip time period is based upon the equation:

$$t_{peak-to-trip} = \frac{3}{4f} - t_{trip-mech-max} - \frac{1}{f_{sample}}$$

$t_{peak\text{-}to\text{-}trip}$=time from occurrence of most recent peak magnitude of most recent current cycle to time of activation of fault interrupter trip mechanism; $t_{trip\text{-}mech\text{-}max}$=maximum time required by the mechanism for the fault interrupter contacts to go from conducting state to non-conducting state; f=electrical distribution system frequency and $f_{sample}$=frequency of the acquisition of current samples by the control.

* * * * *